United States Patent
Arakawa et al.

(10) Patent No.: US 7,638,205 B2
(45) Date of Patent: Dec. 29, 2009

(54) OPTICAL LAMINATE FILM AND METHOD FOR PRODUCING SAME

(75) Inventors: Kohei Arakawa, Tokyo (JP); Katsuhiro Kurosaki, Tokyo (JP); Toshihide Murakami, Tokyo (JP)

(73) Assignee: Zeon Corporation, Tokyo (JP)

( * ) Notice: Subject to any disclaimer, the term of this patent is extended or adjusted under 35 U.S.C. 154(b) by 651 days.

(21) Appl. No.: 10/920,177

(22) Filed: Aug. 18, 2004

(65) Prior Publication Data

US 2006/0040106 A1    Feb. 23, 2006

(51) Int. Cl.
*B32B 27/08* (2006.01)

(52) U.S. Cl. .................. 428/517; 428/519; 428/520; 428/521; 428/522; 428/523

(58) Field of Classification Search .......... 428/517–523
See application file for complete search history.

(56) References Cited

U.S. PATENT DOCUMENTS

| 7,046,443 B2 * | 5/2006 | Miyatake | 359/494 |
| 2002/0060762 A1 * | 5/2002 | Arakawa | 349/117 |
| 2006/0078692 A1 * | 4/2006 | Murakami et al. | 428/1.31 |

FOREIGN PATENT DOCUMENTS

JP    2003-090912    *    3/2003

WO    03/107048 A    *    12/2003

OTHER PUBLICATIONS

Matterial Letters, "Thermal dynamic mechanical and rheological properties of metallocene-catalyzed cycloolefin copolymers with hihg glass transition termperature" Lui ( vol. 61, Issue 2, Jan. 2007) pp. 457-462.*

* cited by examiner

*Primary Examiner*—Kevin R. Kruer
(74) *Attorney, Agent, or Firm*—Birch, Stewart, Kolasch & Birch, LLP

(57) ABSTRACT

An optical laminate film comprising a layer (A) comprising a material having a negative intrinsic birefringence value as a primary component; and a layer (B) comprising a transparent resin as a primary component which is laminated to at least one side of the layer (A). The optical laminate film satisfies the following conditions:

(a) $n_z > (n_x + n_y)/2$ (b) $0 \leq$ dispersion of retardation $Re \leq +10$ nm, wherein retardation Re is represented by the formula $[|n_x - n_y| \times D]$ where D represents thickness (μm) of the laminated film, $n_z$ represents a refractive index in the thickness direction, and $n_x$ and $n_y$ each represent a refractive index, respectively in two directions orthogonal to each other and both of which are perpendicular to the thickness direction, all of the refractive indices being measured using light with wavelength of 550 nm.

18 Claims, No Drawings

OPTICAL LAMINATE FILM AND METHOD FOR PRODUCING SAME

BACKGROUND OF THE INVENTION (1) Field of the Invention

This invention relates to an optical laminate film, which can be easily produced and suitable for compensating birefringence, and a method for producing the optical laminate film.

(2) Description of the Related Art

A liquid crystal display device utilizing birefringence of super twisted nematic (STN) type for high-contrast image is used for a variety of image displays such as in personal computers, word processors or the like. However it is known that the birefringence of liquid crystal cells causes problems in the view angle characteristic of the liquid crystal display device using a twisted nematic liquid crystal, cholesteric liquid crystal or smectic liquid crystal, that is, when the image on the screen is viewed straight on, the image looks good, but when the image is viewed from an oblique view, undesirable discoloration and disappearance of image are liable to occur. To solve this problem, a retardation plate disposed between a liquid crystal cell and polarizing plate has been widely adopted as the conventional approach.

Japanese Unexamined Patent Application Publication (hereinafter referred to as "JP-A") H2-160204 discloses a retardation film characterized by satisfying the formula: $0.92 \leq (R_{40}/Re) \leq 1.08$, wherein Re represents a retardation in the case when a monochromatic light with wavelength 632.8 nm is incident perpendicularly onto a film, and $R_{40}$ represents a retardation in the case when a monochromatic light with wavelength 632.8 nm is incident on the film at an angle of 40 degree to the normal line of the film surface.

U.S. Pat. No. 5,245,456 discloses a birefringent film characterized by a mixture of molecules oriented in the plane direction of the film and molecules oriented in a thickness direction. This US patent further discloses a process for producing the birefringent film characterized in that a shrinkable film is adhered onto one or both surfaces of a resin film to form a laminate film, and then the laminate film is stretched while being heated to impart a shrinking force exerting in the direction perpendicular to the direction in which the resin film is stretched.

U.S. Pat. No. 5,189,538 discloses a liquid crystal display device which includes a liquid crystal cell, a polarizing plate, and at least one film (A) and at least one film (B), which are disposed between the liquid crystal cell and the polarizing plate, wherein the film (A) has light transmittance and meets the condition that the film satisfies the inequality $[N_{TH} - (N_{MD} - N_{TD})/2] > 0$, where $N_{TH}$ represents a refractive index in the direction normal to the film surface, $D_{MD}$ represents a refractive index in the longitudinal direction (i.e., machine direction) of the film, and $N_{TD}$ represents a refractive index in the transverse direction of the film; and the film (B) is a uniaxial-stretched film made of a polymer having a light transmittance and a positive intrinsic birefringence.

However, there are problems when the film has been made by the above disclosed methods. For example, in the case of the method disclosed in JP-A H2-160204, the dispersion of retardation is large and the production efficiency is low. Also this method has difficulty in producing a large sized product, which can be applied to a large sized liquid crystal screen such as a high definition TV. In the case of the process disclosed in U.S. Pat. No. 5,245,456, precise control of the ratio of stretching to shrinkage is required, which leads to a complicated production process and results in reduction of productivity. In the case of the liquid crystal display device disclosed in U.S. Pat. No. 5,189,538, it appears that the film used for the liquid crystal display device is produced easily and the retardation can easily be controlled, particularly when the biaxially-stretched film or the uniaxially-stretched film made of material of negative intrinsic birefringence value is used as the film (A). In practice, it is difficult to make a retardation film by stretching the film having a negative intrinsic birefringence value, such as a vinyl aromatic polymer film, which is preferable in terms of having a large absolute value of the intrinsic birefringence and good transparency. In order to manifest a preferable retardation and hold a uniform retardation of the film, it is necessary to carry out a uniaxial longitudinal stretching or uniaxial transverse stretching with zone heating, or sequential or simultaneous biaxial stretching. However, film-breaking occurs easily during the stretching step because of insufficient strength of the material. Stretching under a high temperature to avoid breaking makes it difficult to obtain the preferred retardation, and gives easily non-uniform retardation. There seems to be no retardation film from a practical standpoint that is made of a material having a negative intrinsic birefringence value and satisfying the inequality $[N_{TH} - (N_{MD} - N_{TD})/2] > 0$.

A retardation film, in which there is substantially no retardation and yet a refractive index in the thickness direction is larger than that of the plane direction, i.e., a positive-retarder, is obtained by carrying out biaxial stretching of the film made of the material with negative intrinsic birefringence value, which can be, for example, expected to be applied to phase-difference compensation film used for display devices using cholesteric liquid crystal. However, a film-breaking still occurs easily at the stretching step because of insufficient strength of the material and because stretching under a high temperature to avoid the breaking makes it difficult to obtain the preferred retardation and leads easily to non-uniform retardation, and therefore, there seems to be no such retardation film from a practical standpoint.

SUMMARY OF THE INVENTION

An object of the invention is to provide an optical laminate film, which is easily produced and capable of properly compensating the birefringence.

Another object of the invention is to provide a method for easily producing the above-mentioned optical laminate film.

It has been found that the above-mentioned objects can be accomplished by an optical laminate film made by laminating a layer comprising a transparent resin as a primary component onto at least one side of a layer comprising a material having a negative intrinsic birefringence value as a primary component, to form an undrawn laminate; and then, stretching the undrawn laminate under specific conditions.

Thus, in one aspect of the present invention, there is provided an optical laminate film comprising:

a layer (A) comprising a material having a negative intrinsic birefringence value as a primary component; and a layer (B) comprising a transparent resin as a primary component which is laminated to at least one side of the layer (A); wherein the following conditions are met;

(a) $n_z > (n_x + n_y)/2$ (b) $0 \leq$ dispersion of retardation Re $\leq +10$ nm, wherein retardation Re is represented by the formula $[|n_x - n_y| \times D]$ where D represents thickness (μm) of the laminated film, $n_z$ represents a refractive index in the thickness direction, and $n_x$ and $n_y$ each represent a refractive index, respectively in two directions orthogonal to each other and both of which are perpendicular to the thickness direction, all of the refractive indices being measured using light with wavelength of 550 nm.

In accordance with the present invention, there is further provided a method for manufacturing the above-mentioned optical laminate film, comprising the steps of:

laminating said layer (B) on at least one side of said layer (A) to form an undrawn laminate film wherein said layer (A) comprises a material having a negative intrinsic birefringence value as a primary component of which glass transition temperature is $Tg_A$ and said layer (B) comprises a transparent resin as a primary component of which glass transition temperature is $Tg_B$, wherein $Tg_B$ is lower than $Tg_A$ by 20° C. or more; and then, stretching the undrawn laminate film at a temperature in the range of from $(Tg_A-10)$° C. to $(Tg_A+20)$° C.

DETAILED DESCRIPTION OF THE INVENTION

An optical laminate film of the present invention comprises a layer (A) comprising a material having a negative intrinsic birefringence value as a primary component, and a layer (B) comprising a transparent resin as a primary component which is laminated to at least one side of the layer (A). The optical laminate satisfies the following conditions: (a) $n_z > (n_x+n_y)/2$, and (b) $0 \leq$ dispersion of retardation Re $\leq +10$ nm, wherein retardation Re is represented by the formula $[|n_x - n_y| \times D]$ where D represents thickness (μm) of the laminated film, $n_z$ represents a refractive index in the thickness direction, and $n_x$ and $n_y$ each represents a refractive index, respectively in two directions orthogonal to each other and both of which are perpendicular to the thickness direction, all of the refraction indices are measured using light with wavelength of 550 nm.

By the term "as a primary component" as used with respect to the content of a material having a negative intrinsic birefringence value in the layer (A) and the content of a transparent resin in the layer (B), we mean that the layer (A) comprises at least 90% by weight, based on the layer (A), of a material having a negative intrinsic birefringence value and the layer (B) comprises at least 90% by weight, based on the layer (B), of a transparent resin. The larger the contents of these ingredients in the layers (A) and (B), the better the optical laminate film. Most preferably, the layer (A) consists of a material having a negative intrinsic birefringence value, and the layer (B) consists of a transparent resin.

By the term "material having a negative intrinsic birefringence value" which is used for the layer (A) of the optical laminate film of the invention, we mean a material, which has negative optical uniaxial properties when the molecules have been uniaxially oriented. For example, in the case where the negative material is a resin, the term refers to a resin such that, when the light is incident on the layer in which molecules are uniaxially oriented, the birefringence of the light in the oriented direction is smaller than the refractive index of the light in a direction orthogonal to said oriented direction. The negative material includes, for example, a resin, a discotic liquid crystal, and a discotic liquid crystal polymer. These materials may be used either singly or in combination of two or more thereof.

As specific examples of the material having a negative intrinsic birefringence value used for the layer (A), there can be mentioned a discotic liquid crystal, a discotic liquid crystal polymer, vinyl aromatic polymers, polyacrylonitrile polymers, poly(methyl methacrylate) polymers, cellulose ester polymers, and their copolymers including bipolymer, terpolymer and higher-copolymers. These materials may be used either singly or in combination of two or more thereof.

Among these, vinyl aromatic polymers, polyacrylonitrile polymers and polymethylmethacrylate polymers are preferable. Vinyl aromatic polymers are especially preferable from the viewpoint of high birefringence development.

The vinyl aromatic polymer refers to a homopolymer of vinyl aromatic monomers, a copolymer made from two or more kinds of vinyl aromatic monomers, or a copolymer made from at least one vinyl aromatic monomer and at least one copolymerizable monomer. As specific examples of the vinyl aromatic monomer, there can be mentioned styrene and styrene derivatives which include those having a structure such that the phenyl side chain of styrene has at least one substituent, such as 4-methylstyrene, 4-chlorostyrene, 3-methylstyrene, 4-methoxystyrene and 4-tert-butoxystyrene, and those having a structure such that the vinyl main chain of styrene has at least one substituent, such as α-methylstyrene. These materials may be used singly or in combinations of two or more. As specific examples of the monomer copolymerizable with the vinyl aromatic monomer, there can be mentioned ethylenically unsaturated monomers such as propylene, butene, acrylonitrile, acrylic acid, methacrylic acid, maleic anhydride, acrylic acid esters, methacrylic acid esters, maleimide, vinyl acetate and vinyl chloride. Among vinyl aromatic polymers, copolymers of at least one monomer selected from styrene and styrene derivatives having at least one substituent in the phenyl side chain or in the vinyl main chain, with maleic acid, is particularly preferable from the viewpoint of good heat resistance.

Thickness of the layer (A) comprising the material having a negative intrinsic birefringence value as a primary component is not limited, but is usually in the range of 5 to 400 μm and preferably 15 to 250 μm.

The material having a negative intrinsic birefringence value used for layer (A) should preferably have a glass transition temperature $Tg_A$ of at least 110° C., more preferably at least 120° C.

As for the transparent resin used for layer (B), there is no specific limitation except that the total light transmittance is at least 80% as measured at a thickness of 1 mm. As specific examples of the transparent resin, there can be mentioned polymer resins having an alicyclic structure, straight chain or branched chain olefin polymers such as polyethylene and polypropylene, polycarbonates, polyesters, polysulfones, polyethersulfones, polystyrene, polyvinyl alcohol, acetylcellulose, polyvinyl chloride and polymethacrylates. These transparent resins may be used either alone or as a combination of at least two thereof. Among these transparent resins, polymer resins having an alicyclic structure and chain olefin polymers are preferred. Polymer resins having an alicyclic structure are especially preferable because of good transparency, low hygroscopic property, high dimensional stability and light weight.

By the term "polymer resins having an alicyclic structure", we mean polymers comprising repeating units having an alicyclic structure. Both types of polymer resins, one of which includes an alicyclic structure in the main chain and the other includes an alicyclic structure in the side chain, are available. The alicyclic structure includes, for example, a cycloalkane structure and a cycloalkene structure. Of these, a cycloalkane structure is preferable because of good heat stability. Although there is no particular limitation for the carbon number of the alicyclic structure, the carbon number usually ranges from 4 to 30, preferably 5 to 20 and more preferably 6 to 15.

The content of repeating units having an alicyclic structure in the polymer resin can be selected according to the intended use. The content is usually at least 50% by weight, preferably at least 70% by weight and more preferably at least 90% by weight. In the case when the content of repeating units having an alicyclic structure is too small, it may lead to reduction of transparency and capability of the optical laminate film.

The polymer resin having an alicyclic structure is not particularly limited, and, as specific examples of the polymer resin, there can be mentioned norbornene polymers, monocyclic olefin polymers, cyclic conjugated diene polymers, vinyl alicyclic hydrocarbon polymers, and hydrogenation products of these polymers. These polymer resins may be used either alone or as a combination of at least two thereof. Among those materials, hydrogenation products of norbornene polymers, and vinyl alicyclic hydrocarbon polymers and hydrogenation products thereof are preferable in view of good heat resistance and mechanical strength.

The norbornene polymers (i.e., polymers having a norbornene structure) include, for example, a ring-opened polymer, i.e., a polymer made by ring-opening polymerization of a monomer having a norbornene structure, a ring-opened polymer made by ring-opening copolymerization of a monomer having a norbornene structure with a monomer copolymerizable therewith, an addition polymer, i.e., a polymer made by addition polymerization of a monomer having a norbornene structure, an addition polymer made by addition copolymerization of a monomer having a norbornene structure with a monomer copolymerizable therewith, and hydrogenation products of these ring-opened polymers and addition polymers. Hydrogenation products of ring-opened polymers made from a monomer having a norbornene structure is especially preferable in terms of high heat resistance and high mechanical strength.

As specific examples of the monomers having a norbornene structure, there can be mentioned bicyclo[2.2.1]hept-2-ene (norbornene), tricyclo[4.3.0.1$^{2,5}$]deca-3,8-diene (dicyclopentadiene), 7,8-benzotricyclo[4.3.0.1$^{2,5}$]deca-3-ene (methanotetrahydrofluorene), tetracyclo[4.4.0.1$^{2,5}$.1$^{7,10}$]dodeca-3-ene (tetracyclododecene), and derivatives from these compounds, such as those which have at least one substituent in the ring. Examples of substituents include an alkyl group, an alkylene group, an alkoxycarbonyl group, and a carboxyl group. A plurality of these substituents, which include the same groups and/or a different groups may be bonded to the ring. These norbornene based monomers may be used singly or as a combination of two or more thereof. As specific examples of the norbornene-based monomers having a substituent or substituents, there can be mentioned 8-methyl-tetracyclo[4.4.0.1$^{2,5}$.1$^{7,10}$]-dodeca-3-ene, 8-ethyl-tetracyclo[4.4.0.1$^{2,5}$.1$^{7,10}$]-dodeca-3-ene, 8-methylidene-tetracyclo[4.4.0.1$^{2,5}$.1$^{7,10}$]-dodeca-3-ene, 8-ethylidene-tetracyclo[4.4.0.1$^{2,5}$.1$^{7,10}$]-dodeca-3-ene, 8-methoxycarbonyl-tetracyclo[4.4.0.1$^{2,5}$.1$^{7,10}$]-dodeca-3-ene, and 8-methyl-8-methoxycarbonyl-tetracyclo[4.4.0.1$^{2,5}$.1$^{7,10}$]-dodeca-3-ene.

As specific examples of monomers, which are copolymerizable with the norbornene monomer by a ring-opening polymerization, there can be mentioned monocyclic olefins such as cyclohexene, cycloheptene and cyclooctene, and the derivatives thereof; and cyclic conjugated diene such as cyclohexadiene and cycloheptadiene, and their derivatives.

The ring-opened polymer made from a norbornene monomer and the ring-opened copolymer made from a norbornene monomer and a copolymerizable monomer are obtained by polymerizing the monomers in the presence of a ring-opening polymerization catalyst.

The catalyst used for the ring-opening polymerization includes, for example, a catalyst containing a halide of a metal such as ruthenium or osmium, a sulfate salt or an acetyl acetone compound, and a reducing agent; and a catalyst containing a halide of a metal such as titanium, zirconium, tungsten or molybdenum or an acetyl acetone compound of a metal such as titanium, zirconium, tungsten or molybdenum, and an organoaluminum compound.

An addition polymer of the norbornene monomer, and an addition copolymer made of the norbornene monomer and at least one other monomer capable of addition copolymerization therewith, are obtained by polymerization of the monomer in the presence of an addition polymerization catalyst.

The catalyst used for the addition polymerization includes, for example, a catalyst containing an organoaluminum compound and a compound comprising a metal such as titanium, zirconium or vanadium.

As specific examples of the monomers capable of addition copolymerization with norbornene monomers, there can be mentioned α-olefins having 2 to 20 carbon atoms such as ethylene, propylene, 1-butene, 1-pentene, 1-octene, 1-decene, 1-dodecene, 1-tetradecene, 1-hexadecene, 1-octadecene and 1-eicosene, and derivatives therefrom; cycloolefins such as cyclobutene, cyclopentene, cyclohexene, cyclooctene and 3a,5,6,7a-tetrahydro-4,7-methan-1H-indene, and derivatives therefrom; and nonconjugated dienes such as 1,4-hexadiene, 4-methyl-1,4-hexadiene, 5-methyl-1,4-hexadiene, and 1,7-octadiene. These monomers may be used singly or as a combination of two or more thereof. Among these, α-olefins are preferable. Ethylene is especially preferable.

As specific examples of the monocyclic olefin polymers used in the present invention, there can be mentioned addition polymers made from cyclohexene, cycloheptene and cyclooctene. These cycloolefin monomers may be used either alone or as a combination of two or more thereof.

As specific examples of the cyclic conjugated diene polymer used in the present invention, there can be mentioned polymers made through 1,2-addition polymerization and/or 1,4-addition polymerization of cyclic conjugated diene monomers such as cyclopentadiene and cyclohexadiene. These monomers may also be used either alone or in combination.

The molecular weights of the norbornene polymer, monocyclic olefin polymer and the cyclic conjugated diene polymer are not particularly limited, and can be appropriately selected according to the intended use. However, the weight average molecular weight (Mw) is usually in the range from 5,000 to 500,000, preferably from 8,000 to 200,000 and more preferably from 10,000 to 100,000, as measured by gel permeation chromatography and as expressed in terms of that of standard polyisoprene or polystyrene.

The vinyl alicyclic hydrocarbon polymer used in the present invention is a polymer having repeating units derived from a vinyl cycloalkene or a vinyl cycloalkane, and, as specific examples thereof, there can be mentioned a polymer of a vinyl alicyclic hydrocarbon compound such as a vinyl cycloalkane such as vinyl cyclohexane or a vinyl cycloalkene such as vinyl cyclohexene, and hydrogenation products thereof; and a polymer of a vinyl aromatic hydrocarbon compound such as styrene or α-methylstyrene in which the aromatic ring is hydrogenated.

The vinyl alicyclic hydrocarbon polymer may be a block copolymer of which the aromatic ring is hydrogenated and a random copolymer of which the aromatic ring is hydrogenated, where the copolymers are made of a vinyl alicyclic hydrocarbon compound or a vinyl aromatic hydrocarbon compound, and other monomer capable of copolymerization with these compounds. There is no specific limitation with the block copolymer. Examples of the block copolymer include di-block, tri-block and more multiple block copolymers, and an inclined block copolymer.

The molecular weight of vinyl alicyclic hydrocarbon polymers is not particularly limited and ca be appropriately selected according to the intended use. However, the weight average molecular weight (Mw) is usually in the range from 10,000 to 300,000, preferably from 15,000 to 250,000 and more preferably from 20,000 to 200,000, as measured by gel permeation chromatography using cyclohexane as a solvent (or toluene if required for the polymer to dissolve) and as expressed in terms of that of standard polyisoprene or polystyrene. With the molecular weight falling in this range, the molded article exhibits good balance between mechanical strength and molding workability.

The above-mentioned hydrocarbon polymers, namely, the ring-opened polymer of a norbornene monomer, the ring-opened copolymer made of a norbornene monomer and other monomer capable of ring-opening copolymerization therewith, the addition polymer of a norbornene monomer, the addition polymer made of a norbornene monomer and other monomer capable of copolymerization therewith, the polymer of vinyl alicyclic hydrocarbon compound, the aromatic ring portion in the polymer of vinyl aromatic hydrocarbon compound monomers, and the copolymer made of a vinyl alicyclic compound or vinyl aromatic compound and other monomer capable of copolymerization with these compounds, can be hydrogenated by a conventional procedure wherein a known hydrogenation catalyst comprising a transition metal such as nickel or palladium is dissolved in a solution of each polymer to effect hydrogenation of preferably at least 90% of the carbon-carbon unsaturated bond in the polymer.

The polymer resin comprising an alicyclic structure preferably used in the present invention contains 5% by weight or less, preferably 3% by weight or less and more preferably 2% by weight or less of an oligomer having a molecular weight of not larger than 2,000. If the content of oligomer in the polymer resin is too large, minute rough spots tend to occur on the surface or the thickness becomes uneven when the polymer resin laminate is stretched.

Reduction of the content of oligomer can be made by optimizing the selection of the polymerization catalyst, hydrogenation catalyst, reaction conditions of polymerization and hydrogenation, and temperature condition for the process of pelletizing polymer resin. The content of oligomer can be measured by gel permeation chromatography using cyclohexane as a solvent (or toluene if necessary to dissolve the polymer resin).

There is no specific limitation with respect to thickness of layer (B) comprising a transparent resin as a primary component, but, the thickness is usually in the range from 15 µm to 250 µm, preferably from 25 µm to 150 µm.

In each of the layer (A) comprising a material with a negative intrinsic birefringence value as a primary component and the layer (B) comprising a transparent resin as a primary component, additives can be incorporated according to the need, provided that the effect of the invention can be obtained. The additives include, for example, antioxidant, heat stabilizer, light stabilizer, ultraviolet absorption agent, antistatic agent, dispersing agent, chlorine scavenger, flame retardant, crystallization nucleating agent, antiblocking agent, anti-fogging agent, mold releasing agent, pigment, organic and inorganic fillers, neutralizing agent, lubricant, decomposing agent, metal deactivator, stainproofing agent, antibacterial agent, and other resins and thermoplastic elastomers.

The optical laminate film of the present invention has the following property, that is, $n_z > (n_x + n_y)/2$, where $n_z$ represents a refractive index in the thickness direction, and $n_x$ and $n_y$ each represent a refractive index, respectively in two directions orthogonal to each other which are perpendicular to the thickness direction, wherein all of the refractive indices are measured using light with wavelength of 550 nm light.

In the optical laminate film of the present invention, $n_x$, $n_y$ and $n_z$ preferably meet the following conditions $n_z > n_x$, and $n_z > n_y$. More preferably $n_x$ and $n_y$ satisfies the conditions $|n_x - n_y| \leq 0.0002$, namely, the absolute value of a difference between $n_x$ and $n_y$ is 0.0002 or less. Especially preferably $|n_x - n_y|$ is 0.0001 or less and most preferably 0.00005 or less. When these conditions are met, the optical laminate film functions better as a positive retarder.

When the optical laminate film of the invention is used as a positive retarder, it should preferably have a retardation Rth in the thickness direction is less than zero. Rth can be appropriately chosen according to the intended use. In order to function as a phase difference-compensating element, Rth value is usually in the range from −50 to −1,000 nm, preferably from −100 to −500 nm. Rth is a value defined by the following formula: $Rth = [(n_x + n_y)/2 - n_z] \times D$, where D is thickness of laminate film.

The dispersion of retardation Re defined as "$|n_x - n_y| \times D$" must be equal to or smaller than 10 nm, and is preferably equal to or smaller than 5 nm and more preferably equal to or smaller than 2 nm. When the optical laminate film is used as a retardation film for a liquid crystal display device, a good quality of display can be obtained with the dispersion of retardation Re falling within the above range.

The dispersion of retardation Re means a dispersion of a number of retardation values with respect to the mean retardation value as calculated from the refractive indexes measured on a plurality of points on the optical laminate film in two directions perpendicular to each other at an incident angle of 0° (i.e., light is incident perpendicularly to the surface of the optical laminate film). The measurement of refractive indexes $n_x$ and $n_y$ is carryout out usually at intersecting points between parallel lines extending, for example, in the width direction of laminate film with an interval of 10 mm and parallel lines extending, for example, in the longitudinal direction of laminate film with an interval of 10 mm.

With respect to glass transition temperature $Tg_A$ of a material having negative intrinsic birefringence value used for the layer (A) and glass transition temperature $Tg_B$ of a transparent material used for the layer (B), it is preferable that $Tg_A(° C.) > Tg_B(° C.)$, and more preferable that $Tg_A(° C.) - 20° C. \geq Tg_B(° C.)$. If $Tg_B(° C.) > Tg_A(° C.)$, and especially when the transparent resin used for the layer (B) has a positive intrinsic birefringence value, the anisotropy of the refractive index of layer (B) occurring upon stretching will cancel the anisotropy of refractive index of layer (A), which may lead to failure in obtaining the intended relationship between the refraction indices of in-plane two directions orthogonal to each other and the refractive index in the thickness direction.

To avoid undesirable warp of the optical laminate film caused by moisture absorption, temperature variation or with time, the layer (B) comprising a transparent resin as a primary component is laminated preferably on both surfaces of the layer (A) comprising a material of negative intrinsic birefringence value as a primary component. In this case, both layers (B) preferably have approximately the same thickness. In the case when the layer (B) is laminated on one side of the layer (A), usually single layer (B) is laminated, although there is no specific limitation with respect to the number of layers (B).

In the optical laminate film of the present invention, an adhesive layer (C) can be placed between the layer (A) and the layer (B).

The adhesive layer (C) can be prepared with a material having an affinity toward both the material of negative intrinsic birefringence value used for the layer (A) and the transparent resin used for the layer (B). As specific examples of the material for adhesive layer, there can be mentioned ethylene-acrylic acid ester or methacrylic acid ester copolymers such as ethylene-methyl acrylate copolymer, ethylene-methyl methacrylate copolymer, ethylene-ethyl acrylate copolymer and ethylene-ethyl methacrylate copolymer; ethylene based copolymers such as ethylene-vinyl acetate copolymer and ethylene-styrene copolymer; and other olefin copolymers. Modified materials of these copolymers can also be used, which are obtained by modification such as oxidation, saponification, chlorination or chlorosulfonation. Use of modified ethylene-based copolymers can improve the handling workability for forming the laminate film and the resistance to heat deterioration of adhesion. With respect to the thickness of adhesive layer (C), it preferably ranges from 1 to 50 μm, more preferably 5 to 30 μm.

In the case of using the adhesive layer (C), the glass transition temperature or softening point $Tg_C(° C.)$ of the adhesive layer (C) preferably satisfies the condition: $Tg_A(° C.) > Tg_C(° C.)$, and more preferably $Tg_A(° C.) - 20° C. \geq Tg_C(° C.)$, where $Tg_A(° C.)$ represents a glass transition temperature of the material having negative intrinsic birefringence value used for the layer (A).

A preferable optical laminate film of the present invention comprises, arranged in the following order, the layer (B), the layer (C), the layer (A), the layer (C) and the layer (B), wherein glass transition temperature ($Tg_B$) of the transparent resin in layer (B) is lower than $Tg_A$ by 20° C. or more, and $Tg_C$ is lower than $Tg_A$ by 20° C. or more.

The optical laminate film of the present invention usually has a thickness in the range from 10 to 500 μm, preferably 30 to 300 μm, and more preferably 50 to 200 μm. Although thinner optical laminate films serve to reduce the thickness and the weight of a liquid crystal display device, the film also needs a certain thickness for mechanical strength and easy handling.

The optical laminate film of the present invention can be used in combination with at least one other retardation film as an inter layer or an outer layer, which is formed, for example, by uniaxial stretching of a film made of positive intrinsic birefringence material.

Although there is no specific limitation with respect to the method of manufacturing the optical laminate film of the present invention, the following method is preferably adopted, which comprises the step of laminating a layer (B) on at least one side of a layer (A) to form an unstretched laminate film wherein the layer (A) comprising a material having negative intrinsic birefringence value as a primary component of which glass transition temperature is $Tg_A$ and the layer (B) comprising a transparent resin as a primary component of which glass transition temperature is $Tg_B$, and wherein $Tg_B$ is lower than $Tg_A$ by at least 20° C.; and then, stretching the laminate film at a temperature ranging from $(Tg_A-10)°$ C. to $(Tg_A+20)°$ C. This method is hereinafter referred to as "manufacturing method of the invention" when appropriate. Wherein the layer (B) may be laminated either directly or through an adhesive layer (C) onto the layer (A).

In the manufacturing method of the invention, the unstretched laminate film is obtained by laminating the layer (B) comprising a transparent resin as a primary component of which glass transition temperature is $Tg_B$ onto at least one surface of the layer (A) comprising a material having negative intrinsic birefringence value as a primary component of which glass transition temperature is $Tg_A$, wherein $Tg_B$ is lower than $Tg_A$ by at least 20° C.

In the case when an adhesive layer (C) having a glass transition temperature of $Tg_C$ is provided, the step of lamination is preferably carried out so as to form a laminate film comprising, arranged in the order, the layer (B), the layer (C), the layer (A), the layer (C) and the layer (B), wherein $Tg_B$ is lower than $Tg_A$ by 20° C. or more and $Tg_C$ is lower than $Tg_A$ by 20° C. or more.

As examples of the method for preparing the unstretched laminate film, there can be mentioned co-extruding methods such as a co-extruding T-die method, a co-extruding inflation method and a co-extruding lamination method; a film lamination method such as a dry-lamination method; and a coating method where a polymer resin solution is coated on a resin film base. Of these, co-extruding methods are preferable in view of the manufacturing efficiency.

The temperature of the extrusion can be appropriately selected according to the kind of the material having a negative intrinsic birefringence value, the transparent resin, or adhesives if used.

In the manufacturing method of the invention, the unstretched laminate film is stretched at a temperature ranging from $(Tg_A-10)°$ C. to $(Tg_A+20)°$ C., where $Tg_A$ refers to a glass transition temperature of the material having a negative intrinsic birefringence value used for the layer (A).

The procedure for stretching the laminate film is not particularly limited and conventional procedures can be adopted. For example, a uniaxial stretching procedure such as a longitudinal uniaxial stretching utilizing a peripheral-velocity difference between rolls, or a transverse uniaxial stretching using a tenter; and a biaxial stretching procedure such as a simultaneous biaxial stretching which gives longitudinal stretching by increasing the distance between clips gripping the film and simultaneously gives transverse stretching by utilizing diverging guide rails of clips, or a sequential biaxial stretching which gives longitudinal stretching first by using a peripheral velocity difference between rolls and then gives transverse stretching by utilizing clips of a tenter. A biaxial stretching procedure is preferable in order to make the retardation substantially null (positive retarder) by making well balanced refractive indices in the in-plane directions orthogonal to each other.

In the manufacturing method of the invention, the unstretched laminate film is stretched normally at a temperature ranging from $(Tg_A-10)°$ C. to $(Tg_A+20)°$ C., and preferably from $(Tg_A-5)°$ C. to $(Tg_A+15)°$ C., where $Tg_A$ refers to a glass transition temperature of the material having a negative intrinsic birefringence value used for the layer (A). With a stretching temperature in this range, the anisotropy of the refractive index of layer (B) can be rendered substantially zero and it is easier to attain the desired relationship between the refractive indices as measured in-plane in two directions orthogonal to each other and the refractive index in the thickness direction.

The ratio of stretching is usually at least 1.1, preferably in the range from 1.1 to 30, and more preferably from 1.3 to 10. Stretching ratios below 1.1 may cause an insufficient orientation, which leads to insufficient manifestation of anisotropy of refractive index, i.e. insufficient retardation, or breaking of the laminate film.

The optical laminate film of the present invention can be easily manufactured, is capable of highly compensating a birefringence, which can be applied as a retardation plate or a view-angle compensating plate singly or in combination with other elements to a variety of display devices such as a liquid crystal display device, an organic EL display device, a plasma display device, an FED (field emission) display device, or an SED (surface electric field) display device. As specific examples of liquid crystal modes for a liquid crystal device, there can be mentioned TN (twisted nematic) type, STN (super twisted nematic) type, HAN (hybrid alignment nematic) type, VA (vertical alignment) type, MVA (multiple vertical alignment) type, IPS (in-plane switching) type, and OCB (optical compensated bend) type. As for the light source, a cold cathode ray tube, a light emitting diode, and an EL are available.

EXAMPLES

The method of the present invention will be explained in detail below by way of working examples, but the invention is not limited to these examples. Part(s) and % refer to part(s) by weight and % by weight unless otherwise specified.

(1) Molecular Weight

Molecular weight is measured by gel permeation chromatography (GPC) using cyclohexane as a solvent (or toluene if necessary to dissolve a polymer resin) and expressed in terms of the weight average molecular weight calculated using standard polyisoprene or polystyrene.

(2) Glass Transition Temperature (Tg)

Glass transition temperature (Tg) is measured by differential scanning calorimetry (DSC) according to JIS (Japanese Industrial Standard) K7121.

(3) Hydrogenation Percentage

Hydrogenation percentage in the main chain and the aromatic ring of polymer is determined by $^1$H-NMR.

(4) Thickness of Film or Laminate Film

Thickness of the film or laminate film is measured by observing a section of the film or laminate film by an optical microscope. A laminate film is measured layer by layer.

(5) Refractive index ($n_z$) in the thickness direction with respect to 550 nm light, refractive indexes ($n_x, n_y$) in two directions orthogonal to each other which are perpendicular to the thickness direction, with respect to 550 nm light; retardation (retardation Re, thickness direction retardation Rth) and dispersion of retardation These items are measured with an automatic birefringence analyzer (KOBRA-21 manufactured by Oji Scientific Instruments Co., Ltd.). The dispersion of retardation Re is defined as a dispersion of a number of retardation values with respect to the mean value as calculated from the refractive indexes measured on a plurality of points on the optical laminate film in two directions perpendicular to each other in a longitudinal direction in which the optical laminate film has been stretched, and a width direction perpendicular to the longitudinal direction, at an incident angle of 0° (i.e., light is incident perpendicularly to the surface of the optical laminate film).

The measurement of refractive indexes $n_x$ and $n_y$ is carryout out at intersecting points between parallel lines extending in the width direction of laminate film with intervals of 10 mm and parallel lines extending in the longitudinal direction of laminate film with intervals of 10 mm.

(6) View Angle Characteristic and Dispersion of Liquid Crystal Display Device

An optical laminate film or an optical film and a uniaxially stretched retardation film are superposed so that the lag phase axis of each film is aligned in parallel, then the superposed films are disposed on the position adjacent to the liquid crystal display element (liquid crystal cell) of TN liquid crystal display apparatus. View angle characteristics are evaluated by visual check. As for the uniaxially stretched retardation film, a uniaxially stretched retardation film is used, which shows retardation of about 450 nm as measured with light of 550 nm wavelength, when it is used in combination with the optical laminate film in the examples of the present invention or the optical laminate film or optical film in the comparative examples.

Production Example 1

Production of Norbornene Polymer 1

In a reaction vessel, 0.82 part of 1-hexene, 0.15 part of dibutyl ether and 0.30 part of triisobutylaluminum were added to 500 parts of dehydrated cyclohexane at room temperature in a nitrogen atmosphere. Then while keeping the temperature at 45° C., a norbornene-based monomer mixture consisting of 170 parts of tricyclo[4.3.0.1$^{2,5}$]deca-3,7-diene (dicyclopentadiene, hereinafter referred to as "DCP") and 30 parts of 8-ethylidene-tetracyclo[4.4.0.1$^{2,5}$.1$^{7,10}$]dodec-3-ene (ethylidene tetracyclododecene, hereinafter referred to as "ETD"), and 40 parts of tungsten hexachloride (0.7% toluene solution) were continuously added over a period of 2 hours to carry out polymerization. Then, 1.06 parts of butyl glycidyl ether and 0.52 part of isopropyl alcohol were added to inactivate the polymerization catalyst and stop the polymerization reaction.

Cyclohexane (35 parts) was added to 100 parts of the thus-obtained reaction solution containing a ring-opened polymer, and then further 5 parts of a nickel/alumina catalyst (manufactured by Nikki Chemical Co., Ltd) was added for hydrogenation. After the pressure was raised to 5 MPa with hydrogen, the reaction solution was stirred and heated up to 200° C., and hydrogenation reaction was carried out for 4 hours to obtain a reaction solution containing 20% of a hydrogenated product of ring-opened DCP/ETD copolymer.

The copolymerization ratio of norbornene monomers in the thus-obtained norbornene-based polymer 1 was calculated based on the composition of residual norbornene monomers using a gas chromatography method in the solution after polymerization. It was found that DCP/ETD=85/15, which was almost the same as the feed composition. Weight average molecular weight (Mw) of the norbornene-based polymer 1 was 35,000, and the molecular weight distribution was 2.1 and the content of resin component having a molecular weight of 2,000 or less was 0.7% by weight. The hydrogenation percentage was 99.9%, and the Tg was 105° C.

After filtering out the hydrogenation catalyst from the polymer solution, an antioxidant (tradename: IRGANOX 1010 available from Ciba Specialty Chemicals K.K.) was added to the polymer solution and dissolved. The amount of antioxidant added was 0.1 part per 100 parts of polymer.

Then the cyclohexane solvent and other volatile components were removed from the polymer solution by using a tubular type condensation drying oven (available from Hitachi, Ltd) at 270° C. under a reduced pressure of lower than 1 kPa to give a hydrogenation product of the ring-opened polymer (norbornene polymer 1).

Production Example 2

Production of Norbornene Polymer 2

A hydrogenation product of ring-opened polymer (norbornene polymer 2) was produced by the same procedures as that for norbornene polymer 1 described in Production Example 1, except that 40 parts of DCP and 160 parts of ETD were used instead of 170 parts of DCP and 30 parts of ETD, respectively. All other procedures and conditions remained the same. The thus-obtained norbornene polymer 2 had a weight average molecular weight (Mw) of 37,000 and a molecular weight distribution of 2.3. The content of resin component having a molecular weight of 2,000 or less was 0.9% by weight. The hydrogenation percentage was 99.9% and the Tg was 130° C.

Production Example 3

Production of Unstretched Laminate Film 1

An unstretched laminate film 1 having a laminate structure composed of layer B (50 μm)/layer C (10 μm)/layer A (200 μm)/layer C (10 μm)/layer B (50 μm) was made by co-extrusion lamination, where the layer B was made of norbornene polymer 1 produced in Production Example 1, the layer A was made of styrene-maleic acid copolymer (tradename, "Daylark D322" available from Nova Chemical Co., Tg=130° C., content of oligomer=3% by weight) and the layer C (adhesive layer) was made of modified ethylene-vinyl acetate copolymer (tradename, "MODIC-AP A543" available from Mitsubishi Chemical Corp., Vicat softening point=80° C.).

Production Example 4

Production of Unstretched Laminate Film 2

An unstretched laminate film 2 having a laminate structure composed of layer B (50 μm)/layer C (10 μm)/layer A (200 μm)/layer C (10 μm)/layer B (50 μm) was made by co-extrusion lamination by the same procedures as described in Production Example 3, except that norbornene polymer 2 produced in Production Example 2 was used instead of norbornene polymer 2 produced in Production Example 1. All other procedures and conditions remained the same.

Production Example 5

Production of Unstretched Film 1—Single Layer Film

An unstretched single layer film 1 with 200 μm in thickness was made by extrusion of styrene-maleic acid copolymer, which was the same as layer (A) used in Production Example 3.

Production Example 6

Production of Uniaxially-Stretched Polycarbonate Film [Retardation Film]

Polycarbonate film with 90 μm in thickness was made by a solution casting method, wherein methylene chloride was used as a solvent, and polycarbonate produced from phosgene and bisphenol through condensation and having a molecular weight of 80,000 and an intrinsic birefringence value of 0.104 was used. Then, the polycarbonate film is stretched by a tenter at 170° C. to make a retardation film. Four types of retardation films, shown below, were prepared which had different stretching ratios from each other.

Retardation film A: stretching ratio: 1.1, retardation: 195 nm.

Retardation film B: stretching ratio: 1.15, retardation: 310 nm.

Retardation film C: stretching ratio: 1.2, retardation: 365 nm.

Retardation film D: stretching ratio: 1.25, retardation: 440 nm.

Example 1

Manufacture of Optical Laminate Film 1

The unstretched laminate film produced in Production Example 3 was cut into a square sheet having a 100 mm×100 mm size. The sheet was uniaxially stretched by a film stretch-testing machine (tradename, "TENSILON UTM-10T-PL" available from Orientec Corporation) at a stretching temperature of 140° C., a stretching ratio of 1.8 and a stretching rate of 40 ml/min to form a stretched laminate film. A square sheet having a 80 mm×80 mm size was cut out from the central part of the stretched laminate film. Characteristics of the thus-obtained optical laminate film 1 were evaluated. The results are shown in Table 1 and Table 2.

Example 2

Manufacture of Optical Laminate Film 2

The optical laminate film 1 manufactured in Example 1 was uniaxially stretched in the same manner as described in Example 1, except that the uniaxial stretching was carried out in the direction orthogonal to that in Example 1 at a stretching ratio of 1.5. A square sheet having a 60 mm×60 mm size was cut out from the central part of the thus-obtained stretched laminate film. Characteristics of the thus-obtained optical laminate film 1 were evaluated. The results are shown in Table 1 and Table 2.

Comparative Example 1

Manufacture of Optical Laminate Film 3

An optical laminate film 3 was manufactured in the same manner as described in Example 1 for the manufacture of optical laminate film 1, except that the unstretched laminate film 2 produced in Production Example 4 was used instead of the unstretched laminate film 1 produced in Production Example 3, with all other procedures and conditions remaining the same. Characteristics of the optical laminate film 1 were evaluated. The results are shown in Table 1 and Table 2.

Comparative Example 2

Manufacture of Optical Laminate Film 4

An optical laminate film 4 was manufactured in the same manner as described in Example 2 for the manufacture of optical laminate film 2, except that the optical laminate film 3 manufactured in Comparative Example 1 was used instead of the optical laminate film 1 manufactured in Example 1, with all other procedures and conditions remaining the same. Characteristics of the optical laminate film 4 were evaluated. The results are shown in Table 1 and Table 2.

Comparative Example 3

Manufacture of Optical Laminate Film 5

An optical laminate film 5 was manufactured in the same manner as described in Example 1 for the manufacture of optical laminate film 1, except that the stretching temperature was changed to 155° C., with all other procedures and conditions remaining the same. Characteristics of the optical laminate film 5 were evaluated. The results are shown in Table 1 and Table 2.

Comparative Example 4

Manufacture of Optical Laminate Film 6

An optical laminate film 6 was attempted to be manufactured in the same manner as described in Example 1 for the manufacture of optical laminate film 1, except that the stretching temperature was changed to 115° C., with all other procedures and conditions remaining the same. However, it resulted in breaking of the laminate film during stretching. Thus, the optical laminate film 6 could not be manufactured.

Comparative Example 5

Manufacture of Stretched Film 1

A stretched film 1 was attempted to be manufactured in the same manner as described in Example 1 for the manufacture of optical laminate film 1, except that the unstretched film 1 produced in Production Example 5 was used instead of the unstretched laminate film 1 produced in Production Example 3, with all other procedures and conditions remaining the same. However, it resulted in breaking of the film during stretching. Thus the stretched film 1 could not be manufactured.

Comparative Example 6

Manufacture of Stretched Film 2

A stretched single layer film 2 was manufactured in the same manner as described in Example 1 for the manufacture of optical laminate film 1, except that the unstretched film 1 produced in Production Example 5 was used instead of the unstretched laminate film 1 produced in Production Example 3, and the uniaxial stretching was carried out at a stretching temperature of 155° C. and a stretching rate of 80 mm/min. All other procedures and conditions remained the same. Characteristics of the thus-obtained stretched single layer film 2 were evaluated. The results are shown in Table 1 and Table 2.

TABLE 1

|  | Optical laminate film or film *1 | Thickness (μm) | | | Refractive index | | | | Retardation | | |
| --- | --- | --- | --- | --- | --- | --- | --- | --- | --- | --- | --- |
|  |  | Total | Layer A | Layer B (total) | $n_X$ | $n_Y$ | $n_Z$ | Relation between $n_Z$ and $(n_X+n_Y)/2$ | Re | Thickness direction | Dispersion of Re (nm) |
| Example 1 | OLF 1 | 200 | 130 | 65 | 1.5744 | 1.5731 | 1.5750 | $n_Z > (n_X+n_Y)/2$ | 255 | −245 | 2 |
| Example 2 | OLF 2 | 125 | 80 | 40 | 1.5734 | 1.5733 | 1.5759 | $n_Z > (n_X+n_Y)/2$ | 12 | −309 | 2 |
| Comparative Example 1 | OLF 3 | 205 | 135 | 65 | 1.5738 | 1.5734 | 1.5736 | $n_Z = (n_X+n_Y)/2$ | 81 | 0 | 3 |
| Comparative Example 2 | OLF 4 | 135 | 85 | 45 | 1.5735 | 1.5733 | 1.5732 | $n_Z < (n_X+n_Y)/2$ | 25 | 26 | 3 |
| Comparative Example 3 | OLF 5 | 205 | 135 | 65 | 1.5962 | 1.5955 | 1.5963 | $n_Z > (n_X+n_Y)/2$ | 140 | −90 | 17 |
| Comparative Example 4 | OLF 6 |  |  |  | Breaking of layer A occurred at stretching | | | | | | |
| Comparative Example 5 | SF 1 |  |  |  | Breaking occurred at stretching | | | | | | |
| Comparative Example 6 | SF 2 | 120 | — | — | 1.5961 | 1.5955 | 1.5962 | $n_Z > (n_X+n_Y)/2$ | 70 | −48 | 15 |

Note,
*1 OLF: Optical laminate film
SF: Stretched film

TABLE 2

|  | Optical laminate film or film | Evaluation when used in liquid crystal device | | |
| --- | --- | --- | --- | --- |
|  |  | Retardation film used in combination | Retardation value of the combination (nm) | Evaluation results of display quality by visual observation |
| Example 1 | OLF 1 | A | 450 | Front view and oblique view up to 45 degree were good. At view angle over 45 degree, graduation was reversed and blue coloring occurred. In-plane display characteristics were uniform. |
| Example 2 | OLF 2 | D | 450 | Front view and oblique view over 45 degree were good. In-plane display characteristics were uniform. |
| Comparative Example 1 | OLF 3 | C | 445 | Front view and oblique view up to 30 degree were good. In-plane display characteristics were uniform. |
| Comparative Example 2 | OLF 4 | D | 465 | Front view and oblique view up to 20 degree were good. In-plane display characteristics were uniform. |

TABLE 2-continued

|  | Optical laminate film or film | Evaluation when used in liquid crystal device | | |
|---|---|---|---|---|
|  |  | Retardation film used in combination | Retardation value of the combination (nm) | Evaluation results of display quality by visual observation |
| Comparative Example 3 | OLF 5 | B | 450 | Front view and oblique view up to 45 degree were averagely fairly good. In-plane display characteristics, color tone and gradation were not uniform on the whole screen. |
| Comparative Example 4 | OLF 6 | — | — | — |
| Comparative Example 5 | SF 1 | — | — | — |
| Comparative Example 6 | SF 2 | C | 435 | Front view and oblique view up to 20 degree were averagely good. In-plane display characteristics, color tone and gradation were not uniform on the whole screen. |

Note,
*1 OLF: Optical laminate film
SF: Stretched film

The results in Table 1 and Table 2 indicate the following.

An optical laminate film manufactured by the method of the invention can meet the following relations, as shown in Examples 1 and 2:

(a) $n_z > (n_x + n_y)/2$ (b) $0 \leq$ dispersion of retardation $Re \leq +10$ nm wherein retardation Re is represented by the formula: $[|n_x - n_y| \times D]$ where D represents thickness (μm) of the optical laminated film, $n_z$ represents a refractive index in the thickness direction, $n_x$ and $n_y$ each represent a refractive index, respectively in two directions orthogonal to each other which are perpendicular to the thickness direction, all of the refraction indices being measured using light with a wavelength of 550 nm; provided $n_x > n_y$. When this optical laminate film is used for a liquid crystal display device, it is found that not only the front view but also the oblique view shows good display qualities and the in-plane display characteristics are good.

Meanwhile, stretched laminate films in Comparative Examples 1 and 2, which are made by stretching the unstretched laminate films, where the glass transition temperatures $Tg_A$ of the material having a negative intrinsic birefringence value for layer (A) and $Tg_B$ of material (transparent resin) for layer (B) are the same, indicate that the relation $n_z > (n_x + n_y)/2$ is not met and/or retardation becomes larger than zero. When these optical laminate films are used for liquid crystal display devices, in-plane display characteristics are uniform, but a view angle range for a good display are narrowly limited to 20 degree or 30 degree.

Comparative Example 3, where the stretching temperature is 25° C. higher than $Tg_A$ of the material having a negative intrinsic birefringence value for layer (A), results in a dispersion of retardation Re exceeding 10 nm. Comparative Example 4, where the stretching temperature is 15° C. lower than $Tg_A$ results in breaking of the layer (A) of the laminate film. Comparative Example 5, where a single layer film is used also results in breaking of the film. Even if a single layer film can be stretched as in Comparative Example 6, the dispersion of retardation Re exceeds 10 nm, and, when this optical laminate film is used for liquid crystal display devices, averagely good view is obtained, but a view angle range for a good display is narrowly limited to 20 degree, and in-plane display characteristics, color tone and gradation are not uniform on the whole screen.

The optical laminate film of the invention is characterized as exhibiting good controllability of retardation, and enabling a high compensation for birefringence, and can be manufactured with good production efficiency. The optical laminate film of the invention can be widely used singly or in combination with other elements, as phase or a view angle compensating plate, for display devices such as liquid crystal display devices, organic EL display devices and the like.

What is claimed is:

1. An optical laminate film comprising:
   a layer (A) comprising a material having a negative intrinsic birefringence value as a primary component; and
   a layer (B) comprising a transparent resin as a primary component which is laminated to at least one side of the layer (A); wherein the following conditions are met;
   (a) $n_z > (n_x + n_y)/2$
   (b) $0 \leq$ dispersion of retardation $Re \leq 10$ nm,
   wherein retardation Re is represented by the formula: $[|n_x - n_y| \times D]$ where D represents thickness (μm) of the laminated film, $n_z$ represents a refractive index in the thickness direction, and $n_x$ and $n_y$ each represent a refractive index, respectively in two directions orthogonal to each other and both of which are perpendicular to the thickness direction, all of the refractive indices being measured using light with wavelength of 550 nm,
   wherein the material having a negative intrinsic birefringence value in the layer (A) has a glass transition temperature ($Tg_A$) higher than glass transition temperature ($Tg_B$) of the transparent resin in the layer (B).

2. The optical laminate film according to claim 1, wherein $n_x$, $n_y$ and $n_z$ meet the following conditions: $n_z > n_x$, and $n_z > n_y$.

3. The optical laminate film according to claim 1, wherein $n_x$, $n_y$, and $n_z$ meet the following conditions: $n_z > n_x$, $n_z > n_y$, and $|n_x - n_y| \leq 0.0002$.

4. The optical laminate film according to claim 1, wherein the material having a negative intrinsic birefringence value is a vinyl aromatic polymer.

5. The optical laminate film according to claim 4, wherein the vinyl aromatic polymer is a copolymer of at least one monomer selected from the group consisting of styrene and styrene derivatives having at least one substituent in the phenyl side chain or in the vinyl main chain, with maleic acid.

6. The optical laminate film according to claim 1, wherein the transparent resin is a polymer resin comprising an alicyclic structure.

7. The optical laminate film according to claim 6, wherein the polymer resin comprising an alicyclic structure is a hydrogenation product of a ring-opened polymer of a monomer having a norbornene structure.

8. The optical laminate film according to claim 1, further comprising a retardation film as an interlayer or outer layer, which is formed by uniaxially stretching a film made of the material with a positive intrinsic birefringence value.

9. The optical laminate film according to claim 1, wherein the $Tg_A$ and the $Tg_B$ meet the following condition: $Tg_A(°C.)-20°C. \leq Tg_B(°C.)$.

10. The optical laminate film according to claim 1, wherein the layer (B) is laminated on both surfaces of the layer (A).

11. The optical laminate film according to claim 1, further comprising an adhesive layer (layer C) between the layer (A) and the layer (B).

12. The optical laminate film according to claim 11, wherein the adhesive layer (layer C) has a glass transition temperature or softening point ($Tg_C$) which is lower than the glass transition temperature ($Tg_A$) of the material having a negative intrinsic birefringence value.

13. The optical laminate film according to claim 12, wherein $Tg_A$ and $Tg_C$ meet the following condition: $Tg_A(°C.)-20°C. \geq Tg_C(°C.)$.

14. The optical laminate film according to claim 12, which comprises, arranged in the following order, the layer (B), the layer (C), the layer (A), the layer (C) and the layer (B), wherein glass transition temperature ($Tg_B$) of the transparent resin in layer (B) is lower than $Tg_A$ by 20° C. or more, and $Tg_C$ is lower than $Tg_A$ by 20° C. or more.

15. A method for producing the optical laminate film as claimed in claim 1, comprising the steps of:
   laminating said layer (B) on at least one side of said layer (A) to form an unstretched laminate film wherein said layer (A) comprises a material having a negative intrinsic birefringence value as a primary component of which glass transition temperature is $Tg_A$ and said layer (B) comprises a transparent resin as a primary component of which glass transition temperature is $Tg_B$, wherein $Tg_B$ is lower than $Tg_A$ by 20° C. or more; and then,
   stretching the laminate film at a temperature ranging from $(Tg_A-10)°$ C. to $(Tg_A+20)°$ C.

16. The method for producing the optical laminate film according to claim 15, wherein the step of stretching the laminate film is carried out at a stretching ratio of at least 1.1.

17. The method for producing the optical laminate film according to claim 15, wherein the unstretched laminate film is formed by co-extrusion.

18. The method for producing the optical laminate film according to claim 15, further comprising an adhesive layer (C) having a glass transition temperature or softening point of $Tg_C$, wherein the step of laminating is carried out so as to form a laminate film comprising, arranged in the order, the layer (B), the layer (C), the layer (A), the layer (C) and the layer (B), wherein $Tg_B$ is lower than $Tg_A$ by 20° C. or more and $Tg_C$ is lower than $Tg_A$ by 20° C. or more.

* * * * *